United States Patent [19]

Thomas

[11] Patent Number: 4,880,872
[45] Date of Patent: Nov. 14, 1989

[54] HEAT RESISTANT HIGH MODULUS REACTION INJECTION MOLDING (RIM) POLYMERS, BLENDS USED IN THE PRODUCTION THEREOF AND A PROCESS FOR PRODUCING THE SAME

[75] Inventor: Arthur K. Thomas, Woodbury, N.J.

[73] Assignee: ICI Americas Inc., Wilmington, Del.

[21] Appl. No.: 847,490

[22] Filed: Apr. 3, 1986

[51] Int. Cl.$^4$ .............................................. C08L 67/06
[52] U.S. Cl. ...................................... 525/43; 525/10; 525/28; 525/438; 525/445; 525/455
[58] Field of Search ...................... 525/28, 10, 43, 455, 525/430, 445

[56] References Cited

U.S. PATENT DOCUMENTS

| | | | |
|---|---|---|---|
| 4,073,828 | 2/1978 | Ferrarini et al. | 260/859 R |
| 4,098,733 | 7/1978 | Olstowski et al. | 521/123 |
| 4,129,641 | 12/1978 | Ferrarini et al. | 264/294 |
| 4,296,020 | 10/1981 | Magrans, Jr. | 260/37 N |
| 4,314,038 | 2/1982 | Markovs | 521/167 |
| 4,442,235 | 4/1984 | Taylor et al. | 521/122 |
| 4,487,908 | 12/1984 | Dominguez | 528/48 |

Primary Examiner—Lewis T. Jacobs
Assistant Examiner—A. Carrillo

[57] ABSTRACT

A composite having a flexural modulus greater than 100,000 psi and excellent heat and damage resistance, consisting essentially of 5–45 weight percent of a vinyl thermoset copolymer and 55–95 weight percent of a polyurea (wherein the reaction product of the isocyanate and diamine chain extender constitutes 50–75 per cent by weight of the polyurea) is prepared by reacting, a mixture comprising:

(a) an ethylenically unsaturated component containing at least one ethylenically unsaturated monomer optionally therewith, one or more ethylenically unsaturated high molecular weight compounds;
(b) a polyoxyalkylene polyamine;
(c) a diamine chain extender;
(d) an aromatic polyisocyanate; and
(e) a curing agent by the reaction injection molding technique. In particular Component B comprising constituents (a), (b) and (c) is combined with Component A comprising constitutents (d) and (e). Component A may further contain the monomer of constituent (a).

5 Claims, No Drawings

HEAT RESISTANT HIGH MODULUS REACTION INJECTION MOLDING (RIM) POLYMERS, BLENDS USED IN THE PRODUCTION THEREOF AND A PROCESS FOR PRODUCING THE SAME

BACKGROUND OF THE INVENTION

1. Field of the Invention

This invention is drawn to reaction injection molding (RIM) processed polyurea compositions having a modulus greater than 100,000 psi, heat sag less than one inch (at 325° F./1 hour) and good damage resistance, blends employed in the production of such compositions and a process for making such polyurea compositions.

2. Description of the Prior Art

Reaction injection molding is a rapid polymerization process commonly employed to produce polyurethanes and polyureas having elastomeric to rigid properties. This technology is employed in the production of automotive parts, such as fascias and bumpers. In the RIM process, two highly reactive streams of chemicals are brought together under high pressure, approximately 2,000 psi, in a small mixing chamber where the streams are impingement mixed by being sprayed directly into each other. The mixed material flows immediately into a mold where the chemical reaction continues and the part is cured. One of the streams, commonly referred to as Component A, contains a polyisocyanate. The other stream, commonly referred to as Component B, contains a high molecular weight isocyanate reactive polymer and a chain extender. The RIM process is widely known and a detailed description of the technology may be found in numerous texts. See in particular "Reaction Injection Molding" edited by Walter E. Becker, Van-Nostrand Rienhold Publishers, 1979.

High modulus RIM polymers are likely candidates to replace steel body panels, provided they are capable of withstanding on-line elevated temperature finishing operations. Such capacities are indicated by the heat sag of the polymer.

The polyurethanes of the prior art characteristically have high modulus and poor thermal resistance, and, thus are unsuitable for use in such capacities. On the other hand, while the prior art polyureas have high thermal resistance, attempts to isolate high modulus polyurea moldings have been unsuccessful. Such failures are chiefly due to two factors:

1. Rapid gelation. This phenomena is due to the virtually instantaneous reaction of amine-terminated polyethers and isocyanates. While aromatic amine chain extenders are often employed to retard the gel time, gelation nevertheless usually occurs prior to the mold being completely filled. As a result, the moldings obtained are not useable.

2. The brittleness of the resulting polymers. The prior art recognizes that higher modulus RIM polyureas and polyurethanes are obtained when the amount of the reaction product of isocyanate plus chain extender (hardblock) in the final product is increased. Unfortunately, polyureas having greater than 50 weight percent hardblock are extremely brittle, prior to post-curing, and therefore usually can not be demolded without cracking.

SUMMARY OF THE INVENTION

It is an object of this invention to provide a RIM processed polyurea composite having high modulus and heat resistance and a process of making and blends used in the production of the same.

This invention comprises a RIM processed composite having a flexural modulus greater than 100,000 psi, heat sag less than 1 inch (at 325° F./1 hour) and good damage resistance, blends useful in the production of such composites and a process for preparing the composites. These RIM processed composites are comprised of a vinyl thermoset copolymer and a polyurea and are prepared by reacting a mixture comprising:

(a) an ethylenically unsaturated component containing at least one ethylenically unsaturated monomer and optionally therewith one or more ethylenically unsaturated high molecular weight compounds:

(b) a polyoxyalkylene polyamine;

(c) a diamine chain extender;

(d) an aromatic polyisocyanate; and (e) a curing agent for (a) by the reaction injection molding technique.

In particular, the invention comprises the blend of (a), (b), and (c) (constituting Component B) and the blend of (d) and (e) (constituting Component A) which when combined by RIM processing techniques renders the above-designated composite. Further, Component A may, optionally, contain a portion or all of the ethylenically unsaturated monomer of constituent (a).

DETAILED DESCRIPTION OF THE INVENTION

It has been discovered that a composite comprising a vinyl thermoset copolymer and a polyurea made by a RIM processing technique not only provides superior thermomechanical properties but also obviates several of the processing limitations apparent with the prior art polyureas.

1. Rapid Gellation. The use of polymerizable vinyl monomers and resins slows the gel time of the reaction mixture relative to the polyurea by diluting the polyurea network. As a result, gel times can be moderated. Thus, the use of this invention is particularly applicable for the production of larger automotive parts, such as body panels.

2. The Brittleness/Toughness of the Resulting Polymer. Unexpectedly, it was discovered that a composite comprising 5 to 45 weight percent of vinyl thermoset resin, and 95-55 weight percent of polyurea, reduces the brittleness of the demolded product; the hardblock level of the polyurea being between 50 and 75 weight percent.

In particular, the composite of this invention is characterized by a high flexural modulus generally between 100,000 and 200,000 psi: heat sag less than one inch (at 325° F./1 hour) and high impact strength, as measured by a Notched Izod between 1 and 10 ft-lbs per inch.

The polyurea formulations of this invention are produced by combining a blend comprising an amine terminated polyether, the ethylenically unsaturated component and a chain extender in the first stream, referred to as component B, with a second stream, referred to as component A, consisting of isocyanate and curing agent in the mixing chamber. Either component may also contain any conventional additive normally employed in making the compositions. The two streams are brought together in a range of proportions by weight of Stream A to Stream B from about 0.20 to about 1.0, preferably from 0.25 to about 0.50. The resulting product is a mixture of two substantially independent polymer systems; the first being a vinyl copolymer and the second being a polyurea.

The ethylenically unsaturated component consists of at least one ethylenically unsaturated monomer which optionally may be substituted with one or more ethylenically unsaturated high molecular weight polymers. While the ethylenically unsaturated monomer constituting the ethylenically unsaturated component is preferably in Component B, it can be included in Component A in order to balance the weight of Components A and B as can readily be appreciated by one skilled in the art. When imparting such a weight balancing effect to the system, the amount of monomer employed in Component A is generally between 25-50% by weight of the total amount of ethylenically unsaturated component normally employed solely in Component B.

In general, by ethylenically unsaturated monomer is meant a monomer containing at least one ethylenically unsaturated group which will either homopolymerize or copolymerize with the ethylenically unsaturated group of the monomer or high molecular weight compound which is in combination therewith. The ethylenically unsaturated monomer may be selected from styrene, vinyltoluene, divinylbenzene, acrylic acid esters, methacrylic acid esters, diallylphthalate, diallylmaleate, diallylfumarate, triallylcyanurate, vinylacetate, vinyl propionate, divinylether, butadiene and acrylonitrile. Examples of acrylic and methacrylic acid esters are methylacrylate, ethylacrylate, n-butylacrylate, 2-ethylhexyl acrylate, methyl methacrylate, pentaerythritol triacrylate and ethylene glycol dimethacrylate. One or more of the monomers in varying proportions may be employed. Styrene and methyl methacrylate, either singly or in combination are especially preferred.

The total amount of ethylenically unsaturated component by weight in Component B is at least 5% and is generally between 5 and 75%, most preferably between 25 and 50% by weight of Component B. When the ethylenically unsaturated component contains both ethylenically unsaturated monomer and high molecular weight polymer(s), the amount of monomer to polymer is such that the combination of monomer and high molecular weight polymer is liquid at room temperature, and is generally between 5:95 and 95:5.

The ethylenically unsaturated compound (polymer) may be a polyester, polyester urethane, polyester ether, vinyl ester ether, vinyl ester urethane and polyisocyanurate resins.

Polyester Resins

Ethylenically unsaturated resins which are useful are well known in the art and are prepared by reacting polycarboxylic acids or their anhydrides with polyhydric alcohols. Such resins have molecular weights ranging from 400-4000, preferably between 1000-3000 and are primarily linear. They can contain branched chains by employing polyols or polycarboxylic acids having more than two functional groups. Usually they contain a plurality of ethylenically unsaturated linkages distributed along the backbone of the polymer chains. The use of alpha, beta-ethylenic unsaturation polycarboxylic acids combines a convenient method of introducing ethylenic unsaturation into the polyester resins. It is preferred to employ alpha, beta-ethylenically unsaturated dicarboxylic acids such as maleic, fumaric, citraconic, gamma-dimethyl citraconic, metaconic, itaconic, alphamethyl itaconic, gamma-methyl itaconic, tetraconic and mixtures thereof. Minor amounts of alpha, beta-ethylenically unsaturated carboxylic acids containing three or more carboxylic groups, such as aconitic acid, together with the above described dicarboxylic acids are also useful. Whenever available, the anhydrides of any of the aforementioned alpha, beta-ethylenically unsaturated polycarboxylic acids may be substitued for the acid.

In addition, suitable saturated acids or their anhydrides may also be incorporated along with the unsaturated acids. Such saturated acids include phthalic acid, isophthalic acid, terephthalic acid, tetrabromophthalic acid, tetrachlorophthalic acid, adipic acid, sebacic acid, glutaric acid, pimelic acid and the anhydrides thereof. Of particular interest may be mentioned mixtures of isophthalic or orthophthalic acid in combination with fumaric/maleic acids.

Any of a large number of ethylenically unsaturated or saturated polyhydric alcohols may be employed with the polycarboxylic acid or suitable mixtures as discussed above. Dihydric alcohols and especially saturated aliphatic diols are preferred. Among the dihydric alcohols which may be employed are saturated aliphatic diols such as ethylene glycol, propylene glycol, butylene glycol, diethylene glycol, dipropylene glycol, triethylene glycol, tetraethylene glycol, butane diol, pentane diol, hexane diol, neopentylglycol, bisphenol A and its alkoxylated derivatives, and mixtures thereof. Among the polyols having more than two hydroxyl groups which may be employed in minor amounts to form branched chains are saturated aliphatic polyols such as glycerol, trimethylolethane, trimethylolpropane, pentaerythritol, arabitol, xylitol, dulcitol, donnitol, sorbitol, mannitol and mixtures thereof. In addition, aliphatic aromatic diols and polyols may be employed as well as halogenated and alkoxylated derivatives thereof. Furthermore, aromatic polyols and derivatives thereof, such as alkoxylated derivatives of bisphenol A may be employed. Of particular interest is the mixture of propylene glycol and polyoxypropylene (2.2) bisphenol A. These polyester resins may contain terminal carboxylic or hydroxyl groups or may be terminated by vinyl ester groups by the additional condensation therewith of such materials such as glycidyl methacrylate or ethylacrylate, hydroxypropyl acrylate or methacrylate, or vinyl monoacetate and alcohols. A particularly preferred polyester is propylene glycol maleate polyester.

Polyester Urethane Resins

Polyester urethane resins are condensation products of at least two molecules of hydroxy-terminated polyester resins described in the above paragraph with a polyisocyanate or polyisocyanate terminated prepolymer in such proportions that substantially no unreacted —NCO groups remain. Of particular interest is a condensation product of a polyester formed by reacting stoichiometric quantities of polyoxyalkylene bisphenol A maleate/isophthalate polyester with stoichiometric proportions of toluene diisocyanate or polymethylene polyphenyl isocyanate.

Polyester Polyether Resins

Such resins include polyester condensates as described above having further incorporated therewith condensation products resulting from reacting terminal hydroxy groups on the polyester with epoxides such as propylene and ethylene oxide or polyepoxides such as diglycidyl bisphenol A.

Vinyl Ester Ethers

Polyester ethers include state of the art ethylenically unsaturated polyepoxide condensation products such as those formed from epichlorohydrin and such diols as bisphenol A and vinyl compounds such as hydroxy propyl methacrylate, acrylic acid and methacrylic acid.

Vinyl Ester Urethanes

Vinyl ester urethanes are condensation products of ethylenically unsaturated polyesters having terminal isocyanate groups similar to those described above which are further reacted with vinyl ester materials containing active hydrogens such as hydroxypropylmethacrylate, hydroxyethylacrylate, and which are preferrably prepared as described in U.S. Pat. No. 3,876,726 and U.S. Pat. No.4,182,830, the teachings of which are hereby incorporated by reference.

Polyisocyanurate Resins

The ethylenically unsaturated resins may also contain polyisocyanurates such as poly (1,3,5-tri-R substituted S-triazine-2,4,6-trione) wherein the R groups may also be linked with epoxy, polyurethane and polyester resins. Such isocyanurates are represented and prepared as described in U.S. Pat. Nos. 2,952,665; 3,041,313; 3,821,098; 3,850,770; 3,719,638; 3,437,500; 3,763,269. Of particular interest are the polyvinyl isocyanates described in U.S. Pat. Nos. 4,128,537 and 4,195,146, the teachings of which are hereby incorporated by reference. Polyisocyanurate resins can be considered as crosslinked networks of isocyanurate rings having ethylenically substituted aromatic pendant groups. Aromatic rings may be linked to ethylenically unsaturated moieties through carbamyl, urylene, ether, carbonyl, carboxyl and combinations thereof. In most instances, satisfactory resins are prepared by reacting a polyisocyanurate with a hydroxyl terminated ethylenically unsaturated compound such as ethylenically unsaturated monohydroxy alcohols, monohydroxy ethylenically unsaturated esters, monoamino ethylenically unsaturated esters, monohydroxy ethylenically unsaturated ureas, ethylenically unsaturated monoamines, ethylenically unsaturated hydroxyl amines and polyalkoxylated vinyl alcohols. These compositions are formed wherein monohydroxy compounds are reacted under conditions which favor the reactivity of only one isocyanate per molecule of the polyisocyanurate aromatic compound.

The polyoxyalkylene polyamines employed in this invention have at least two groups reactive with —NCO and a molecular weight between 200–5,000. Examples of suitable polyoxyalkylene polyamines are described in U.S. Pat. No. 4,296,020.

In particular, preferred results are obtained by using a polyoxyalkylene polyamine having a molecular weight of about 190 to about 3,000, with a preferred range of about 190 to about 1,000 which have a general formula selected from the group consisting of:

(a) $H_2NCH_2—CXH (OCH_2CHX)_yNH_2$ (b) a triamine of polyalkoxylated trimethylol propane having the general formula:

$CH_3CH_2C[CH_2(O\ CH_2—CHX)_zNH_2]_3$ where X is H or an alkyl group having 1–18 carbon atoms, y and z are numbers between 2 and 16 and 1–11, respectively. These amines are prepared according to the procedure outlined in U.S. Pat. No. 3,666,788, and (c) $R[(OCH_2CHX)_nCHYCHZ\ NHA]_m$ where R is the nucleus of an oxyalkylation-susceptible aliphatic polyhydric alcohol containing 2–20 carbon atoms and 2–8 hydroxyl groups, A is hydrogen or a cyano-lower-alkyl radical having 1 or 2 carbon atoms (which may optionally be substituted by a lower alkyl group containing 1 to 8 carbon atoms) between the nitrogen and cyano radical (provided at least one A is a cyano-lower-alkyl radical), Z is an alkyl group containing 1–18 carbon atoms, X and Y are hydrogen or Z, n has an average value of 0–50 and m is 2–8, R is saturated and consists of carbon and hydrogen.

Of particular interest in the practice of the invention are polyoxypropylene diamines and cyanoethylated polyoxypropylene diamines having molecular weight in the range of 230–3000: and polyoxypropylene triamine and cyanoethylated polyoxypropylene triamine having molecular weights ranging from 400–5000.

Further examples of amines suitable for use include those described in U.S. Pat. No. 4,073,828.

Further the amount of polyoxyalkylene polyamine employed is between 30 and 75 percent by weight of the total weight of Component B. Preferably, the amount of polyamine used is greater than 35 weight percent and is most preferably between 35 and 50 weight percent.

The chain extender may be a $C_1–C_{18}$-aliphatic, $C_6–C_{16}$-cycloaliphatic or aromatic polyamine. Suitably employed as aliphatic and cycloaliphatic diamines are ethylene diamine, propylene diamine, hexamethylene diamine, trimethyl hexamethylene diamine, isophorone diamine, 1-amino-3-amino-3,5,5-trimethyl cyclohexane, hydrogenated di(aminophenyl)methane, hydrogenated methylene dianiline, diamino methane, and hydrogenated toluene diamine. The most useful of these are those that are liquids up to 75° C. For those which are solids under these conditions, vinylidene monomer solutions can be employed to form the homogeneous mix rapidly.

Aromatic diamines are especially preferred as chain extender. Any suitable aromatic diamine having at least one linear lower alkyl substituent preferably with 1 to 3 carbon atoms in the ortho position to each amine group may be employed. It is further preferred to use diamines which have at least one such linear alkyl substituent in ortho position to the one amino group and two lower alkyl substituents, preferably with 1 to 3 carbon atoms, in both the ortho positions of the other amino group. Most preferred are those diamines which have an alkyl substituent in all ortho positions to both amino groups. The aromatic diamines can also be used in admixture with other aromatic diamines. The chain extender is commonly employed or described in many patents, especially U.S. Pat. Nos. 3,428,610; 4,218,543; 4,374,210; 4,396,729; 4,288,564; 4,298,701; 4,296,212; 4,379,105 and 4,442,235. Preferred diamine chain extenders include toluylene-2,6-diamine including 2,4- and 2,6-diaminotoluene; 2,5-diaminoxylene; 1,3-diethyl-2,4-diaminobenzene; 1,3-dimethyl-2,4-diaminobenzene; 2,4-diaminomesitylene; 1-ethyl-2,6-diaminobenzene; 1-methyl-3,5-diethyl-2,4-diaminobenzene; 1-methyl-3,5-diethyl-2,6diaminobenzene; 1,3,5-triethyl1-2,6-diaminobenzene (DETDA); 3,5,3'-5-tetraethyl-4,4-diaminodiphenylmethane; 2,6-diethylnaphthylene-1,5-diamine;

2-ethyl-1,3diaminobenzene; 4,4'-diaminodiphenylmethane; 1,2-, 1,3- or 1,4-phenylene diamine; 2,4'- or 4,4'-diamino-diphenylmethane; naphthylene-1,5-diamine; triphenyl4,4'-4"-triamine. Especially preferred is 1,3,5-tri-ethyl-2,6-diaminobenzene (DETDA). Further, the total amount of diamine in Component B is between 5 and 40 weight percent of the B component, preferably between 5 and 30, most preferably between 10 and 15 weight percent.

The polyisocyanate employed in this invention may be bi-functional, tri-functional or polyfunctional up to as many as six isocyanate groups per - molecule. The polyisocyanate may be aliphatic, cycloaliphatic or aromatic or may contain, in the same polyisocyanate molecule, aliphatic and aromatic isocyanate groups or aliphatic and cycloaliphatic isocyanate. Mixtures of two or more different polyisocyanates may be employed. Isocyanates having a —NCO equivalent weight of about 100–3000 are preferred.

Examples of suitable polyisocyanates include 4,4'-diphenylmethane diisocyanate (pure MDI), 2,4- and 2,6-toluene diisocyanate (TDI) and mixtures thereof, isophorone diisocyanate, tetramethylene diisocyanate, pentamethylene diisocyanate, hexamethylene diisocyanate and 4,4'-dicyclohexylmethane diisocyanate. Diisocyanate and/or polyisocyanates wherein the —NCO groups are aromatically bound are especially preferred. Particularly useful is polymethylene polyphenyl isocyanate which comprises a mixture having 2–6 isocyanate groups per molecule and which has a functionality averaging between 2.1 and 3 isocyanate groups per mol and most often 2.3–2.7 isocyanate groups per mol and is sometimes referred to in the art as crude MDI.

The polyisocyanates of this invention also include polyisocyanate precursors, such as prepolymers of either the urea or urethane type. Such precursors include —NCO terminated polyurethane or polyurea prepolymers of short chain length. Such materials are also referred to as polyisocyanate variants which are free flowing liquids.

Typical variants, such as those disclosed in U.S. Pat. No. 4,229,347, are made by reacting one of the above designated polyisocyanates with a low molecular weight polyol or polyamine. The polyol or polyamine employed in the production of such polyisocyanate variants will readily be recognized by one skilled in the art. The polyol is preferably an alkylene glycol, most preferably one selected from the group consisting of dipropylene glycol, tripropylene glycol or a higher polypropylene glycol. The higher polypropylene glycols are generally made by addition of propylene oxide to propylene glycol and consist of a mixture of polypropylene glycols of varying molecular weight: they are normally defined by their number average molecular weight.

Examples of alkylene glycols which may be used as constituents of the alkylene glycol mixture include diethylene glycol, triethylene glycol, tetraethylene glycol, 1,2- and 1,3-propylene glycols, neopentyl glycol, 1,3-butylene glycol and 1,2-butylene glycol.

The proportions of the three or more glycols contained in the mixture may vary widely, and in part the proportions will be dependent on the particular glycols used. Although proportions outside this range may be used we have found that convenient mixtures of glycols are those wherein the molar percentage of any one of the glycols is not more than 70% and not less than 15% of total glycols used. We prefer compositions wherein the molar percentage of any one of the glycols is not more than 50% and not less than 25% of the total glycols used. Where more than three glycols are used, the constituents of the alkylene glycol mixture are preferably selected such that no more than two of the glycols are other than dipropylene glycol, tripropylene glycol or a higher propylene glycol.

Preferred mixtures of glycols are mixtures of dipropylene glycol or tripropylene glycol with two other alkylene glycols each of which has at least one secondary hydroxyl group. It is preferred that in such mixtures the dipropylene glycol or the tripropylene glycol is present in an amount of 27-45 molar percent, for example 27-31 molar percent of the total glycols and that the two other alkylene glycols are in approximately equal molar proportions.

The polyisocyanate employed in such variants is preferably a solid diphenylmethane diisocyanate, for example diphenylmethane-4,4'-diisocyanate, diphenylmethane-2,4'-diisocyanate and mixtures thereof, optionally containing small amounts of other isomers. Substantially pure diphenylmethane-4,4'-diisocyanates may be used, for example diphenylmethane-4,4'-diisocyanate containing not more than 10% by weight of isomers thereof. Most preferably 10 to 35% of the isocyanate groups of such polyisocyanate variants have been reacted with the low molecular weight polyols or polyamines.

Variants may also contain uretonimine modified diisocyanates. Such variants are produced by first converting the isocyanate group(s) of one of the above-mentioned polyisocyanates into a carbodiimide group by heating the polyisocyanate at elevated temperatures. The uretonimine group is then formed as an adduct of the carbodiimide group and an isocyanate group according to the reaction:

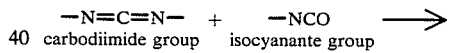
carbodiimide group    isocyanante group

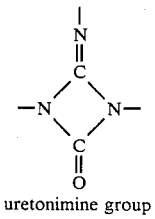
uretonimine group

Suitable catalysts for the conversion of the isocyanate into the carbodiimide group are well known in the art. In particular the conversion maya be effected by heating the isocyanate with a catalyst of the formula:

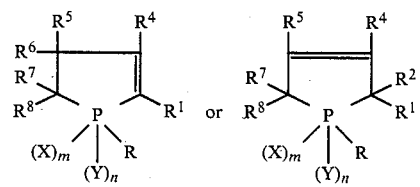

wherein R is phenyl, benzyl or ethyl, $R^1$, $R^2$, $R^5$, $R^6$, $R^7$ and $R^8$ are hydrogen, $R^4$ is methyl, X and Y may be chlorine or bromine or X and Y taken together may represent the divalent atoms $=O$ or $=S$ or the divalent radical $=N$ aryl, m and n represent 0 or 1 and are the same in any one compound, followed by deactivation of the catalyst by adsorption on a substrate or by addition of one or more of the halides of hydrogen, phosphorus or tin or an oxyhalide of phosphorus or sulphur. Such catalysts for the production of uretonimine modified diisocyanates and a method of producing the same are disclosed in U.S. Pat. No. 4,014,935.

Further, the total amount of polyisocyanate or precursor thereof in Component A is between 90 and 98 percent by weight of the total weight of Component A.

Conventional curing agents may be employed in this invention for curing the vinyl thermosetting copolymer. Most preferred are organic peroxides, including ketone peroxides such as methyl ethyl ketone peroxide; diacyl peroxides such as benzoyl peroxide: and peroxyesters such as t-butyl peroxybenzoate, t-butyl peroxyoctoate, t-amyl peroxyoctoate and 2,5-diperoxy octoate. Other suitable organic peroxides are peroxyketals, peroxydicarbonates and 2,4-pentanedione peroxide. In addition, combinations of organic peroxides can be used. Some of these peroxides react at low temperatures to produce free radical initiators while others are activated at higher temperatures or by the presence of an accelerator such as a dilute soap solution of certain transition metals and/or an amine accelerator. Suitable transition metal soap solutions include those with vanadium, chromium, manganese, iron, cobalt, nickel, copper, zinc, molybdenum or lead or combinations thereof. Suitable amine accelerators include dimethyl aniline, N,N-dimethylparatoluidine and the like. The preferred curing agent is 2,5-dimethyl-2,5-bis(2-ethyl hexoyl peroxy)hexane. The amount of curing agent employed is between 0.1 and 5 weight % of Component A, preferably between 0.5 and 3 weight %.

The reactants constituting Components A and B may be added in any sequence to obtain the respective stream as will readily be recognized by one skilled in the art. Preferably, the reactants are simultaneously added to a mixing vessel and stirred at room temperature until they are homogenized; generally from 30 seconds to 2 hours and usually from 45 seconds to 20 minutes. Alternatively, the respective components may be obtained by sequentially adding their constituents to a vessel and stirring. For example, Component B could be obtained by adding to a suitable vessel an ethylenically unsaturated monomer and polymer and stirring the solution for 45 seconds: and then adding to the resultant, the polyoxyalkylene polyamine and diamine chain extender. The solution is then stirred for approximately 15 minutes.

In addition to the reaction components discussed above which are employed in the process of the invention there can be present, generally in Component B, other optional additives such as dispersing agents, surfactants, flame retardants, pigments, reinforcing agents and fibers in accordance with procedures well known in the art.

Components A and B when fed into the mold are maintained between room temperature and 100° C., preferably between 40 and 60° C. It is further sometimes desired to post-cure the molded product at a temperature within the range between 50° C. to 175° C., preferably by placing the product in an oven.

The examples which follow exemplify the improvement obtained by this invention. However, these examples are not intended to limit the scope of the invention. In these examples JEFFAMINE T-3000 is a commercially available polypropylene oxide triamine (from Texaco Chemical Company) with an equivalent weight of about 1,000, a number average molecular weight of about 3,000 and is terminated with primary amino groups: JEFFAMINE T-5000 is a commercially available polypropylene oxide triamine (from Texaco Chemical Company) with an average equivalent weight of about 1700, a number average molecular weight of about 5,000 and is predominately terminated with primary amino groups (at the end of the polyether chain); JEFFAMINE D-2000 is a commercially available polypropylene oxide diamine (from Texaco Chemical Company) with an average equivalent weight of about 1,000 and a number average molecular weight of approximately 2,000; Rubinate LF-179 is a quasiprepolymer low molecular weight glycol modified liquid variant of 4,4'-diphenylmethane diisocyanate, with a free isocyanate content of 23.2% and a viscosity of 900 cps at 25° C. and is commercially available from Rubicon Chemicals, Inc.; Rubinate M is polymethylene polyphenyl isocyanate (MDI) having a functionality of 2.7, commercially available from Rubicon Chemicals, Inc. The term "curing agent" refers to 2,5-dimethyl-2,5-bis(2ethylhexoylperoxy)hexane; and PGM refers to propylene glycol maleate polyester resin. A reaction injection molding machine similar to that disclosed in U.S. Pat. No. 4,189,070 was also employed. Further, the parts by weight of the components in Examples 1-7 are expressed in terms of total weight of Components A and B. In all examples, the heat sag test employed was according to ASTM D-3769-79. The test employed a specimen with a 4 inch overhang at a temperature of 325° F. for 1 hour.

EXAMPLE 1

JEFFAMINE D-2000 (25.75 weight percent), DETDA (10.34 weight percent), styrene (18.74 weight percent) and PGM (15.90 weight percent) were simultaneously added to a reaction vessel and mixed at room temperature until homogeneous. The resultant was then transferred to the B Component tank of the RIM machine. The temperature of Component B was maintained at 60° C. Rubinate LF-179 (28.27 weight percent) and curing agent (0.99 weight percent) were also mixed similarly in a vessel and the resultant was then transferred to A Component tank of the RIM machine. The temperature of Component A was maintained at 40° C. Components A and B were then injected (pressure: 1500 psi) into a 5 × 9 × ⅛ inch steel mold which had been preheated to 100° C. The parts were released in 5 minutes. The part was then post-cured in an oven for 1 hour at 100° C. Upon cooling to room temperature, the parts had high modulus and good temperature resistance, as evidenced by the following properties:
flexural modulus: 200,000 psi
heat sag (4 inches/325°F./1 hour): 0.2 inch
notched izod: 1.0 ft-lb/in

EXAMPLES 2-7

Example 1 was repeated using the reactants and operating conditions summarized below. The physical characteristics of the released molded parts are tabulated in Table I.

EXAMPLES

| | 2 | 3 | 4 | 5 | 6 | 7 |
|---|---|---|---|---|---|---|
| Comp. A (wt. %) | | | | | | |
| Rubinate M | — | — | — | 30.8 | — | — |

EXAMPLES-continued

|  | 2 | 3 | 4 | 5 | 6 | 7 |
|---|---|---|---|---|---|---|
| Rubinate LF-179 | 25.64 | 28.79 | 34.21 | — | 26.84 | 29.0 |
| Styrene | 4.68 | — | — | — | — | — |
| Curing Agent Comp. B (wt %) | 0.99 | 0.99 | 0.99 | 0.99 | 0.99 | 0.99 |
| PGM | 15.90 | 14.77 | 8.98 | 8.98 | 14.48 | 9.23 |
| Styrene | 14.06 | 17.41 | 10.57 | 10.57 | 17.05 | 10.86 |
| methylmethacrylate | — | — | — | — | — | 8.31 |
| Jeffamine D-2000 | 29.94 | — | — | — | — | — |
| Jeffamine T-3000 | — | — | — | — | 31.39 | 31.39 |
| Jeffamine T-5000 | — | 26.4 | 31.41 | 31.41 | — | — |
| DETDA | 8.796 | 11.64 | 13.84 | 17.25 | 9.26 | 10.23 |
| Operating Conditions |  |  |  |  |  |  |
| Comp. A Temp, °C. | 40 | 40 | 40 | 40 | 40 | 40 |
| Comp. B Temp, °C. | 60 | 60 | 60 | 60 | 60 | 60 |
| Mold Temp., °C. | 100 | 100 | 100 | 100 | 100 | 100 |
| Mold Residence Time, min. | 5 | 5 | 5 | 5 | 5 | 5 |
| Postcure (hr/°C.) | 1 hr/ 100° C. | 1 hr/ 100° C. | 1 hr/ 100° C. | 1.5/ 163° C. | 1/5 163° C. | 1.5/ 163° C. |

TABLE I

|  | 2 | 3 | 4 | 5 | 6 | 7 |
|---|---|---|---|---|---|---|
| Flexural Modulus (psi) ($\times 10^3$) | 140 | 150 | 100 | 120 | 140 | 150 |
| Heat Sag in. (4"/325° F./1 hr) | 0.2 | 0.1 | 0.2 | 0.1 | 0.2 | 0.2 |
| Notched Izod (ft-lbs/in) | 1 | 1 | 2 | 1 | 1 | 2 |

EXAMPLES 8-9

Compositions are prepared by simultaneously adding the below-tabulated components to a reaction vessel and mixing the components at room temperature until homogeneous. When transferred to the B Component tank of a RIM machine and mixed with Component A of Example 1 (and under the conditions recited in Example 1) the physical properties of the resulting composites are similar to those properties characterizing the composite of Example 1.

|  | Examples | |
|---|---|---|
|  | 8 | 9 |
| Styrene | 23.46 | 23.70 |
| Jeffamine D-2000 | 40.54 | — |
| Jeffamine T-5000 | — | 43.65 |
| DETDA | 12.54 | 11.00 |
| Methyl methacrylate | — | 21.65 |
| 2-Ethylhexyl acrylate | 23.46 | — |

What is claimed is:

1. A blend which comprises:
   (a) at least 5% by weight of an ethylenically unsaturated component containing at least one ethylenically unsaturated monomer and at least one ethylenically unsaturated polymer;
   (b) 30–75% by weight of a polyoxyalkylene polyamine of molecular weight between 190 to 3,000 wherein said polyamine is selected from the group consisting of:
   (1) a diamine of the general formula $H_2NCH_2$—CXH $(OCH_2CHX)_yNH_2$ where X is H or an alkyl group having 1-18 carbon atoms and where y is a number from about 2 to about 16;
   (2) a triamine of polyalkoxylated trimethylol propane of the general formula: $CH_3CH_2C[CH_2$—$CHX)_zNH_2]_3$ where X is H or an alkyl group having 1-8 carbon atoms and z is between 1 and 11, and
   (3) $R[OCH_2CHX)_nOCHYCHZ\ NHA]_m$ where R is the nucleus of an oxyalkylation-susceptible aliphatic polyhydric alcohol containing 2-20 carbon atoms and 2-8 hydroxyl groups, A is hydrogen or a cyano-lower-alkyl radical having 1 or 2 carbon atoms optionally substituted with an alkyl group containing 1 to 8 carbon atoms between the nitrogen and cyano radical provided at least one A is a cyano-lower-alkyl radical, Z is an alkyl group containing 1-18 carbon atoms, X and Y are hydrogen or Z, n has an average value of 0-50 and m is 2-8, R is saturated and consists of carbon and hydrogen
   (c) 5-40% by weight of a diamine chain extender selected from the group consisting of (i) $C_1$–$C_{18}$ aliphatic diamines, (ii) $C_6$–$C_{16}$ cycloaliphatic diamines, and (iii) an aromatic diamine having at least one lower alkyl substituent in the ortho position to each amine group.

2. The blend of claim 1 wherein said polymer is a polyester or polyisocyanurate.

3. The blend of claim 2 wherein said polyester is propylene glycol maleate polyester.

4. The blend of claim 3 wherein said ethylenically unsaturated monomer is either styrene, methyl methacrylate or a combination thereof.

5. The blend of claim 4 wherein said diamine chain extender is diethyltoluenediamine.

* * * * *

UNITED STATES PATENT AND TRADEMARK OFFICE
CERTIFICATE OF CORRECTION

PATENT NO. : 4,880,872

DATED : November 14, 1989

INVENTOR(S) : Arthur K. Thomas

It is certified that error appears in the above-identified patent and that said Letters Patent is hereby corrected as shown below:

Claim 1, line 29 should read --1-18 carbon atoms-- not "1-8 carbon atoms".

Signed and Sealed this

Thirtieth Day of October, 1990

Attest:

HARRY F. MANBECK, JR.

*Attesting Officer*  *Commissioner of Patents and Trademarks*